XR 2,883,522

April 21, 1959 A. BROSH 2,883,522

MOBILE COMMUNICATION SYSTEM WITH CARRIER SIGNAL STRENGTH CONTROL

Filed May 18, 1955 3 Sheets-Sheet 1

INVENTOR.
AMNON BROSH
BY
Edward M. Farrell
ATTORNEY

INVENTOR.
AMNON BROSH
BY Edward M. Farrell
ATTORNEY

INVENTOR.
AMNON BROSH
BY Edward M. Farrell
ATTORNEY

United States Patent Office 2,883,522

Patented Apr. 21, 1959

2,883,522

MOBILE COMMUNICATION SYSTEM WITH CARRIER SIGNAL STRENGTH CONTROL

Amnon Brosh, Philadelphia, Pa., assignor to Tele-Dynamics Inc., a corporation of Pennsylvania Application May 18, 1955, Serial No. 509,215

1 Claim. (Cl. 250—6)

This invention relates to communication systems, and more particularly to communication systems employing a plurality of stations.

The increased traffic load on many of our highways throughout the country has necessitated increased policing to provide efficient traffic control. Numerous toll highways, or turnpikes, have been constructed in recent years to speed up and otherwise facilitate the flow of such traffic. The increased traffic load with its attendant increase in police control has necessitated the development of suitable highway communication systems.

Highway communication systems have assumed varying degrees of complexity dependent upon the number of stations within the systems and the facilities which the systems are designed to accommodate. In a toll highway, or turnpike, for example, the communication system generally provides coverage for mobile units over the entire distance of the turnpike. In addition to this, telephone and teletype interconnection between various police stations may also be provided.

A communication system associated with a turnpike may, among other things, include a plurality of mobile communication units for the use of the police, maintenance, emergency service and supervisory groups.

Direct radio communication between different mobile stations along a turnpike is often impractical due to the relatively great distances between some of the stations, likelihood of interference within the system, operating frequencies involved in the system or other reasons. Consequently, in order to provide suitable communication between the mobile stations, a plurality of fixed relay stations, or base stations, are provided at various points along the entire length of the turnpike. This arrangement provides a system in which intelligence signals from a mobile station are transmitted to its nearest fixed station. The fixed station relays the intelligence signals to to its adjacent fixed stations where relaying of the intelligence signals may take place. Additional information may be inserted at any of the fixed stations before relaying the intelligence signals, if desired. Each of the fixed stations receiving the relayed intelligence signals, as well as the fixed station receiving the original intelligence signals will retransmit the intelligence signals to other mobile or fixed stations closed by. Thus it is seen that each of the fixed stations is equipped both to relay and to transmit the intelligence signals. Of course, if the receiving fixed station is a terminating station, no relaying of the intelligence signals is necessary.

In designing communication system associated with a turnpike, each of the mobile stations, as well as the fixed stations, may be provided with a transmitter and a receiver designed to operate in the very high frequency, i.e., V.H.F. range. The transmitter and receiver provide the means of communication between the mobile and fixed stations. Since a mobile station must be free to roam the full distance of the turnpike without changing its transmitting or receiving frequencies as it approaches different fixed stations, the V.H.F. frequencies of such receivers and transmitters are generally fixed. The particular frequencies chosen for the V.H.F. system generally depends upon the frequency spectrum available, the strength of other nearby transmitting stations and by other considerations.

Each of the fixed stations are further provided with a second transmitter and receiver, generally designed to operate in the microwave or ultra high frequency, i.e., U.H.F., range. The microwave transmitter and receiver are utilized to relay intelligence signals between the fixed stations.

In many of the turnpike communication systems presently employed, intelligence signals, such as those emanating from speech, frequency modulate the V.H.F. carrier frequency of a mobile station transmitter. Upon reception of the V.H.F. carrier modulated signals by a nearby fixed station, the V.H.F. carrier is demodulated to recover the original intelligence signals. The intelligence signals then frequency modulate the carrier of the V.H.F. transmitter of the fixed station and are transmitted to nearby mobile stations. The microwave carrier of the fixed station is also modulated by the intelligence signals and transmitted to adjacent fixed stations. At the adjacent fixed stations, the original intelligence signals are recovered by a demodulation process and frequency modulate the V.H.F. transmitter carriers of the adjacent fixed stations. The microwave transmitters of the adjacent fixed stations relay the intelligence signals, if further relaying of such intelligence signals is necessary.

It is seen that in a highway communication system, such as outlined, it is necessary that only one of the fixed stations receive intelligence signals from a mobile station at one time. If more than one of the fixed stations are continuously operative to receive the intelligence signals, effective control over the communication system would be difficult to maintain. For example, various troubles including cross modulation, phase shifting or partial cancellation of the original intelligence signals is likely to occur within the system. In order to minimize such troubles and to assure that only one fixed station will maintain control over the system, control signals from an originating fixed station are transmitted to other fixed stations to render inoperative the V.H.F. receivers of the other fixed stations. Relays, commonly referred to as carrier operated relays, are employed to initiate this function as well as other functions within the system.

Such a carrier operated relay is associated with each of the V.H.F. receivers of the fixed stations. The carrier operated relay may be connected to appropriate multiplexing circuitry to perform various functions within the system. Actuation of the carrier operated relay affects circuitry which in turn keys the V.H.F. transmitter of the fixed station in which the V.H.F. signals are received. The keying of the V.H.F. transmitter of the originating fixed station permits transmission of the received intelligence signals to other nearby mobile stations. The carrier operated relay is also connected with a portion of the multiplexing circuitry which permits keying of a tone generator and transmission of a tone to provide a control signal. This control signal is used to key the V.H.F. transmitters and to lock out the V.H.F. receivers of the other fixed stations. The V.H.F. transmitter carriers of the other fixed stations are frequency modulated by the intelligence signals derived from the microwave carrier of the originating station. The modulated signals are then transmitted to nearby mobile stations. The locking out of the V.H.F. receivers in the other fixed stations eliminate the possibility of two sources of V.H.F. signals feeding the system at the same time, since only one carrier operated relay may be actuated after transmission of the control signal.

Many of the present carrier operated relays are actuated or energized by the reduction in the noise level of the V.H.F. receivers. It is known that a frequency modulated or F.M. receiver has a high noise output when no carrier signal is being received. In many present highway communication systems this noise is rectified with the rectified noise being fed to the carrier operated relay. The relay is inoperative during the absence of a carrier signal or in the presence of a relatively high noise level. When a carrier signal is received by the V.H.F. receiver, the noise level of the receiver is greatly reduced. The rectified noise is reduced thereby permitting the carrier operated relay to be actuated. The multiplexing circuits associated with the carrier operated relay then performs certain functions, such as previously indicated. Most of the carrier operated relays employed in present systems are designed so that a preset minimum noise reduction or any value above the minimum operates the relay instantaneously.

In many cases a mobile station, such as a police car, moving between two fixed stations, originates an intelligence signal which is simultaneously received by two fixed stations. One of the fixed stations may receive a signal which is slightly over the minimum strength necessary to actuate its relay, and is therefore noisy, while the second fixed station may receive a relatively strong and clear signal, also above the minimum. In this case, both carrier operated relays in the two fixed stations will start to operate simultaneously. If the relay associated with the receiver of the first fixed station has a slight mechanical advantage, such as its contacts being slightly closer to its shorting bar or arm, the first fixed station receiving the weaker or noisier signal will take control of the whole system. The V.H.F. receiver receiving the stronger signal will therefore be locked out by the control signal received from the station receiving the weaker signal. It is seen that when the fixed station receiving the weaker signal controls the system that all the stations within the system will receive corresponding noisier intelligence signals.

Special mobile direction antenna systems have been suggested to assure that the station receiving the stronger signal will maintain control over the system. Aside from the expense and complexity involved in such systems, special knowledge of the location of the various fixed stations by the operators of the mobile stations is generally necessary. In such costly systems, an operator of a mobile station directs his antenna or signals towards the closest fixed station. However, various other factors, such as topographical conditions of the surrounding area may interfere with the transmitted signals. In this case, the closer fixed station towards which an operator directs his signal actually receives a weaker and therefore noisier signal than the signal which an adjacent fixed station which is further away from the mobile station is capable of receiving.

It is an object of this invention to provide a communication system in which the one of a plurality of stations receiving the strongest signal from a transmitting station will control the system.

It is a further object of this invention to provide a communication system in which one of a plurality of fixed stations receiving the strongest electrical signal from a mobile transmitting station will effectively lock out the receivers in other fixed stations.

It is a further object of this invention to provide an improved communication system in which a station receiving the strongest signal controls the system without the necessity of complicated or costly antenna systems.

In accordance with the present invention, a communication system comprising a plurality of receiving stations having receivers operable to receive intelligence signals from a transmitting station is provided. Each of the receiving stations has means for generating a control signal. Means are provided for transmitting the control signal from one of the receiving stations to other receiving stations within the system. The control signal is utilized in the other receiving stations to render inoperative their associated receivers. Time delay means are interposed between the receivers and the means for transmitting the control signal. This time delay is inversely proportional to the strength of the received intelligence signals whereby the receiving station receiving the strongest intelligence signal from the transmitting station will transmit the control signal and thereby control the system.

Other objects and advantages of the present invention will be apparent and suggest themselves to those skilled in the art to which the invention is related from a reading of the following specification and claim, in connection with the accompanying drawings, in which:

Figure 1:
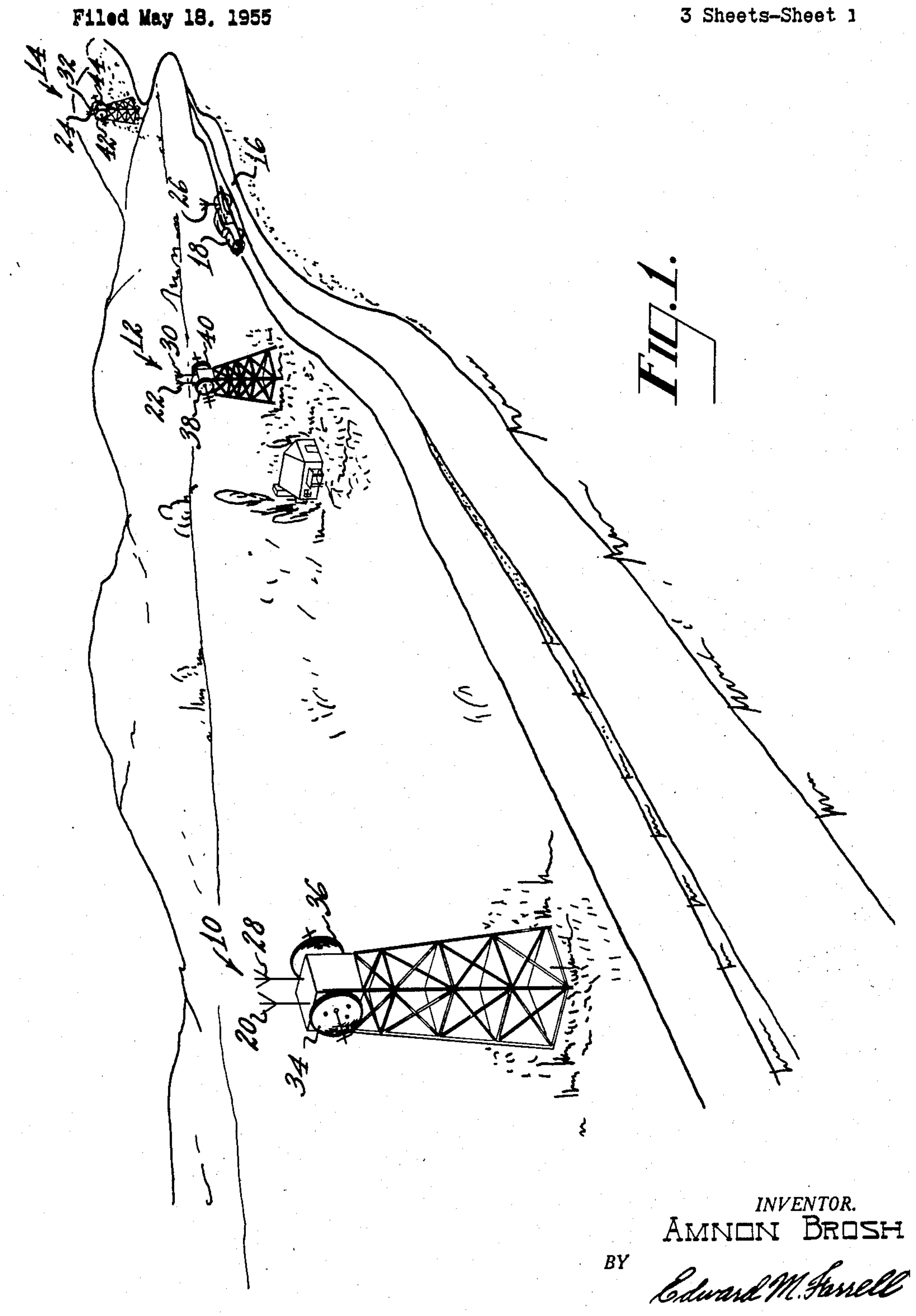
Figure 1 is a perspective view of a highway in which a communication system embodying the present invention may be employed.

Referring particularly to Figure 1, a plurality of fixed or base stations 10, 12 and 14 are disposed along a highway 16. A mobile station 18 is depicted as an automobile moving along the highway 16 between the fixed stations 12 and 14. Each of the fixed stations are provided with means for transmitting and receiving intelligence signals from the mobile station 18. Antennas 20, 22 and 24 associated with fixed stations 10, 12 and 14, respectively, are adapted to transmit intelligence signals to the antenna 26 of the mobile station 18. Antennas 28, 30 and 32, associated with the fixed stations 10, 12 and 14, respectively, are adapted to receive intelligence signals transmitted from the mobile station 18 through the antenna 26. In this case, the antenna 26 is used for both transmitting and receiving intelligence signals. Separate antennas could be used, if desired. Likewise, each of the transmitting and receiving antennas of the fixed stations may be combined into a single antenna. If such a single antenna is used, appropriate electrical circuits are utilized to prevent interference between the transmitting and receiving portions of the system. The antenna 26 of the mobile station 18 is connected to a suitable receiver and transmitter, not shown.

Each of the fixed stations are further provided with means to provide two way communication therebetween. The fixed station 10 is provided with microwave antennas 34 and 36; the fixed station 12, with microwave antennas 38 and 40; and the station 14, with microwave antennas 42 and 44. Each of the microwave antennas at each of the fixed stations are designed to both receive and relay electrical signals from its adjacent fixed station.

In the system illustrated, the communication between the mobile station 18 and the fixed stations 10, 12 and 14 is attained by means of frequency modulated transmitters and receivers operating in the V.H.F. range. The two way communication or relaying between the fixed stations is attained by means of frequency modulated transmitters and receivers operating in the V.H.F. or microwave band.

Figure 2:
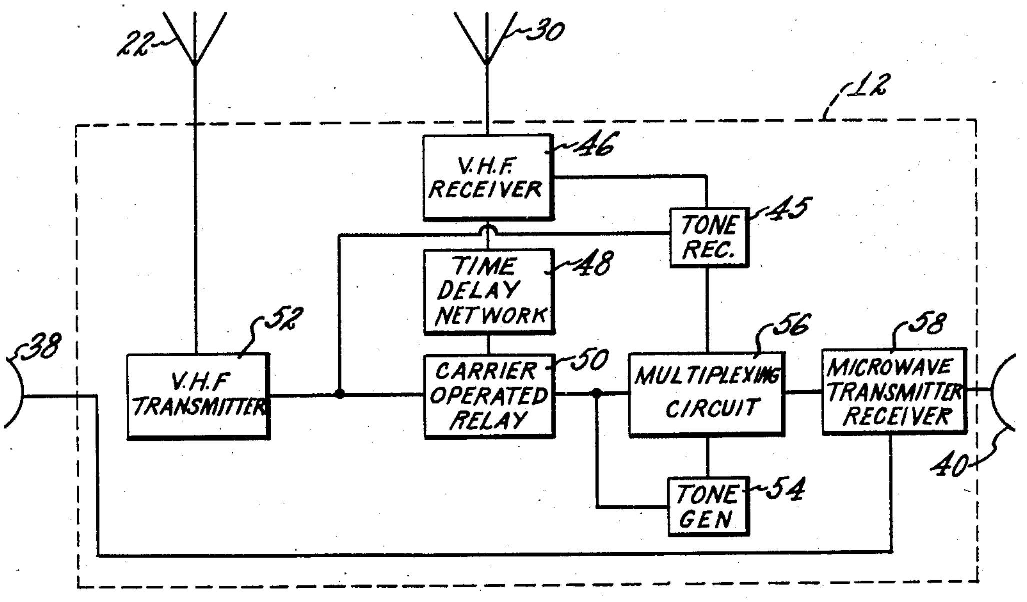
Figure 2 is a block diagram of one of the fixed stations shown in Figure 1, in accordance with the present invention

Referring particularly to Figure 2, the fixed station 12, shown in Figure 1, is represented in the form of a block diagram and is representative of substantially all the fixed stations, except the terminal stations, within the system. Electrical signals originating from a nearby mobile station are received by the antenna 30 and applied to a V.H.F. receiver 46. An output from the receiver, which is indicative of the signal strength and which may be, for example, in the form of rectified noise taken from the discriminator circuit of an F.M. receiver, is applied to a time delay network 48. The time delay network 48 which may be an integral part of the receiver 46 or a separate unit will be subsequently described in detail.

The electrical output from the time delay network 48 is applied to a control device or carrier operated relay 50. The carrier operated relay is associated with a tone generator represented by the block 54 and a multiplexing circuit represented by the block 56. The multiplexing circuit 56 is connected to a microwave transmitter and receiver, represented by a block 58. The tone generator 54 and the multiplexing circuit 56 may comprise circuits of various types presently in use. Such circuits are well known to those skilled in the art and, therefore, will not be shown or described in detail. The microwave transmitter-receiver 58 is connected to microwave antennas 38 and 40 to permit transmission and reception of electrical signals from the fixed stations 12 to its adjacent fixed stations 10 and 14, shown in Figure 1.

Figure 3:
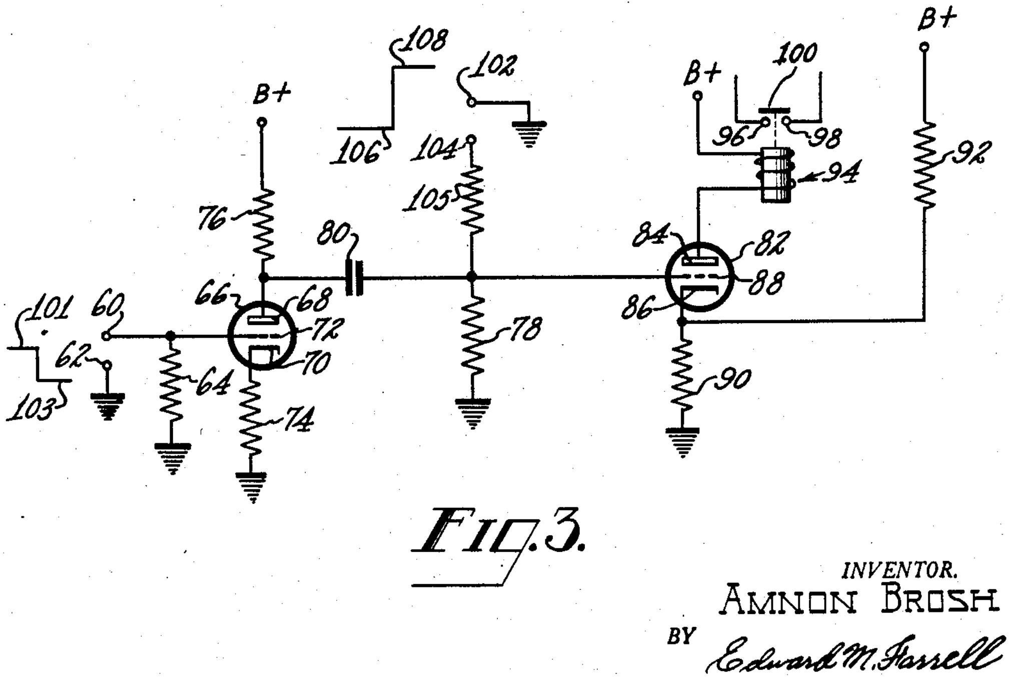
Figures 3, 4 and 5 are schematic diagrams of various types of time delay circuits, in accordance with the present invention.
Figure 4:
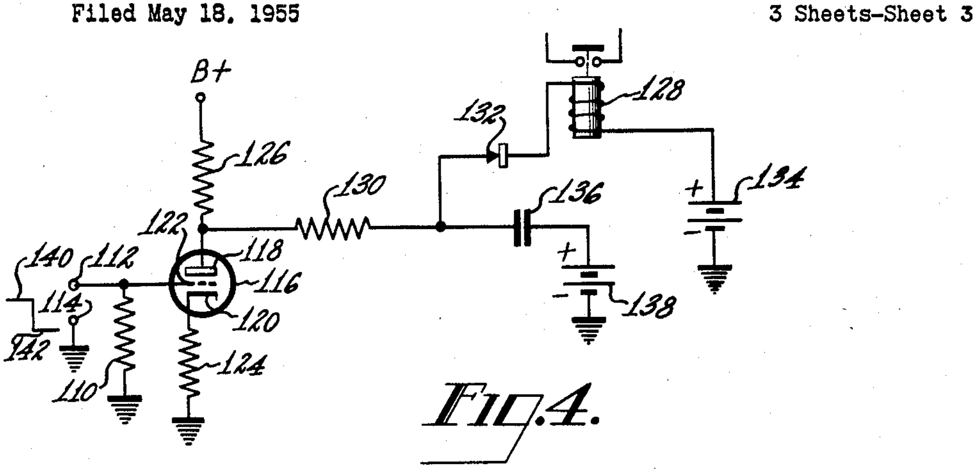
Figure 5:
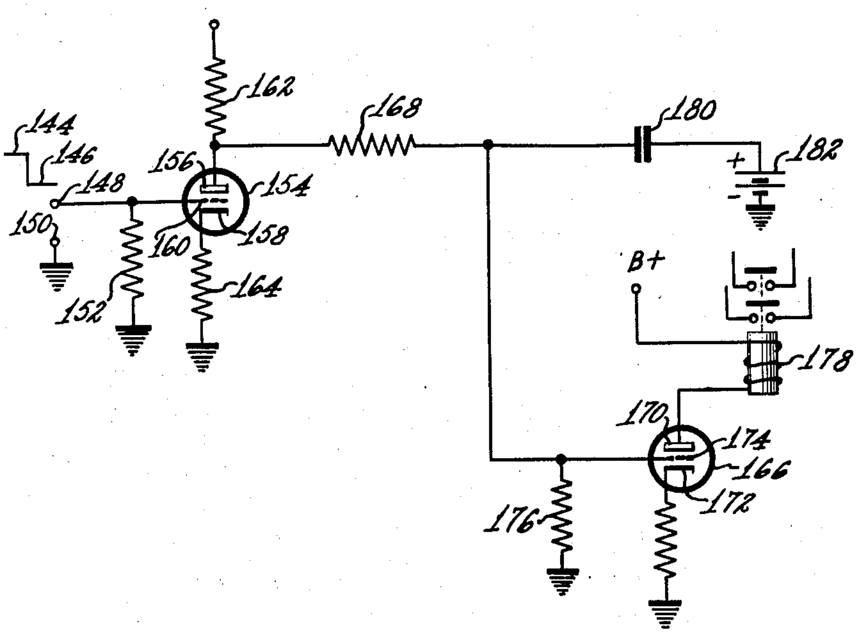

When the carrier operated relay 50, which may comprise a mechanical relay associated with an electrical circuit to be hereinafter described in connection with Figures 3, 4 and 5, is actuated it keys the V.H.F. transmitter 52. The intelligence signals from the V.H.F. receiver 46 modulates the carrier of the V.H.F. transmitter and is transmitted to nearby stations through the antenna 22. Actuation of the carrier operated relay 50 also permits a control signal from the tone generator 54 to be applied to the microwave transmitter 58 through the multiplexing circuit 56. This control signal is transmitted to adjacent fixed stations through the microwave antennas 38 and 40 and is effective to lock out the V.H.F. receivers and to key the V.H.F. transmitters in the adjacent fixed stations. Intelligence signals from the V.H.F. receiver 46, as well as the control signal, are also transmitted to the adjacent fixed stations through the microwave antennas 38 and 40. These intelligence signals are applied to the V.H.F. transmitter at the adjacent fixed stations and transmitted to nearby mobile stations. It is seen that when the carrier operated relay 48 in the fixed station 12 is actuated before the carrier operated relays associated with other adjacent fixed stations that the fixed stations 12 will originate the control signal and thereby control the entire system.

When the fixed station 12 is not the originating or controlling station, it may receive microwave signals from adjacent fixed stations through the antennas 38 and 40. In this case, the control signal received is applied to a tone receiver 45. The electrical output from the tone receiver 45 is applied to lock out the V.H.F. receiver 46 and is effective to key the V.H.F. transmitter 52. Relaying of the intelligence signals may also take place. For example, an intelligence signal received by the antenna 40 may pass through the fixed station 12 and be retransmitted or relayed through the antenna 38.

It is seen that if a time delay network 48 is not present that the output from the V.H.F. receiver 46 will be applied directly to the carrier operated relay 50. When a mobile station 18, such as shown in Figure 1, originates a transmission, it is possible that the two fixed stations 12 and 14 will receive the transmitted signal simultaneously. Assume that the fixed station 14 is receiving a signal slightly over the minimum while the fixed station 12, being closer to the mobile station, receives a strong and clear signal. Assume, further, that the signals received by both fixed stations 12 and 14 are above the maximum level, i.e., the noise level is reduced, to a predetermined minimum which is necessary to actuate the carrier operated relay associated with each of the V.H.F. receivers in the fixed stations. If the relay associated with the fixed station 14 has a slight mechanical advantage, its associated relay will be actuated. The station receiving the weaker signal will thereby control the system. Under these conditions, all the fixed stations within the system will receive noisier intelligence signals than they would if the station receiving the stronger or less noisy signal had controlled the system.

It is seen that if a time delay network 48 is interposed between the V.H.F. receiver 46 and the carrier operated relay 50 that a delay in the actuation of the relay will result. If this delay is made inversely proportional to the strength of the received V.H.F. carrier signal, the stronger or less noisy signal will have a definite advantage in actuating the carrier operated relay in a relatively short time. Likewise, it will take a weaker, or noisier, signal a longer time to actuate the carrier operated relay. Consequently, a communication system employing such a time delay network 48 provides a system in which the fixed station receiving the strongest signal will maintain control over the system despite slight mechanical differences in relay structures.

The V.H.F. receiver illustrated by the block 46 is commercially available from R.C.A. under its type number CR9A, the V.H.F. receiver illustrated by the block 52 is commercially available from R.C.A. under its type number CT12B; and the microwave transmitter receiver unit illustrated by the block 58 is commercially available from R.C.A. under its type number CW20. The tone receiver illustrated by the block 45 is commercially available from Lenkurt Electric Company, San Carlos, California under its type number 443, which is described in a bulletin issued by said company in Form 443A–S, issue No. 3, dated August 1951. The tone generator illustrated by the block 54 is commercially available from Lenkurt Electric Company under its type number 441, which is described in a bulletin issued by said company in Form 441A–S, issue No. 3, dated August 1952. The multiplexing circuit unit illustrated by the block 56 is commercially available from Lenkurt Electric Company under its type number 33C, which is described in a bulletin issued by said company in Form 33C1–DES, issue No. 2, dated June 1954. Units of similar types which perform the same function are manufactured and commercially available from companies other than R.C.A. and Lenkurt Electric Company.

A general description of a system similar to one described by applicant may be found in the May 1955 issue, No. 18, of "Communications and Electronics" in an article entitled "A Communication System for the New York State Thruway" on pages 253 to 261, written by D. S. Dewire and H. A. Evans. This publication is published bi-monthly by the American Institute of Electrical Engineers, 20th and Northampton Streets, Easton, Pa.

The time delay network illustrated by the block 48 and the carrier operated relay illustrated by the block 50 involve features directly involving applicant's invention and, consequently, are illustrated in detail in Figures 3, 4 and 5 of the drawing.

Referring particularly to Figure 3, there is shown one type of time delay network which may be employed with the present invention. This circuit is shown and claimed in detail in copending application Serial No. 511,663, of Amnon Brosh, filed May 27, 1955 and assigned to the same assignee as the present invention. An electrical output from a V.H.F. receiver, which may, for example, be rectified noise, is applied to a pair of input terminals 60 and 62 across an input grid or leak resistor 64. The terminal 62 is connected to a point of reference potential, hereinafter referred to as ground. The noise voltage is amplified by an electron discharge device 66 having an anode 68, a cathode 70 and a control grid 72. A grid biasing resistor 74 is connected between the cathode 70 and ground. The anode 68 is connected to a source of operating potential, designated a B+, through a load resistor 76.

The anode 68 of the device 66 is coupled to the control grid 88 through a coupling capactior 80. The device 82 includes an anode 84, a cathode 86 and a control grid 88. A resistor 90 is connected between the cathode 86 and ground. The cathode 86 is also connected to B+ through resistor 92. The anode 84 is connected to B+ through a relay 94 having a pair of contacts 96 and 98 and a movable arm or shorting member 100. A pair of terminals 102 and 104 are also connected across the input circuit of the device 82 through the resistor 105.

In considering the operation of the circuit shown, assume that a normal noise level with no carrier signal applied to the F.M. receiver is at a level 101, as indicated by the waveform at the input terminals 60 and 62. During the time that the noise is at this level, the level of the voltage applied to terminals 102 and 104 is at a level 106, as indicated by the waveform at these terminals. Upon reception of a carrier signal by the receiver, the input noise drops to a level 103 indicated by the waveform at terminals 60 and 62. At the same instant, the voltage at the terminals 102 and 104 rises to a level 108 as indicated by the waveform. The sudden drop of the noise level may be used to control circuits to trigger a multivibrator or other bistable circuit to obtain the instantaneous voltage rise at the terminals 102 and 104.

The electron discharge device 82 is biased so that it is normally cut-off, or close to cut-off, when no carrier signal is being received by the receiver. The noise is therefore at the relatively high level 101. The voltage applied to the terminals 102 and 104, indicated by the level 106, is normally not sufficient to cause conduction within the discharge device 82. It is seen that with no current, or very little current, flowing in the device 82 that the relay 94 will remain inactuated with its shorting arm 100 separated from the contacts 96 and 98. This relay may be the carrier operated relay previously referred to. Actuation of the relay 94 causes the arm 100 to short out the contacts 96 and 98 to affect the operation of various multiplexing circuits which perform certain desired functions. Among the circuits actuated by the relay is a tone generator, such as illustrated by the block 54 in Figure 1.

When the noise level 101 drops below a certain preset level, such as to level 103, the potential at the anode 68 rises due to the decreased voltage drop across the load resistor 76. At the same time, the potential at the grid 88, starts to rise from a level 106 to a level 108. In the present circuit the voltage level of 108 is greater than the voltage at the anode 68 during the time when the noise level 103 is applied to the grid 72.

In considering the present circuit, it is seen that if the capacitor 80 were not present, the step-up of the voltage from the level 106 to the level 108 at the grid 88 would be sufficient to cause conduction in the device 82 almost immediately, the rise in voltage being limited only by the resistor 105. The relay 94, will therefore be actuated almost immediately. However, due to the presence of the capacitor 80, the voltage at the grid 88 cannot rise instantaneously due to the relatively low impedence path of the capacitor at the instant of voltage rise. It is seen that the voltage at the grid 88 will start to rise towards a point at which the device 84 will start to conduct. The length of time or delay depends largely upon the voltage at the anode 68, which represents the amplified noise voltage. The higher the noise level, the lower will be the voltage at the anode 68 and consequently the delay in the rise of voltage at the grid 88 will be longer.

It is seen that when a sudden voltage is applied to the grid 88 through the terminals 102 and 104 that it starts to charge the capacitor 80 immediately. When the step-up voltage is first applied to the grid 88, the capacitor 80 acts as a short circuit at the first instant thereby causing the voltage at the grid 88 to rise to the same voltage as the anode 68 in a short step. The capacitor 80 will then start to charge toward the voltage level 108. When the charging voltage is high enough to exceed the cut-off potential of the device 82, or increases to a certain point, conduction takes place, or increases, in the device 82 thereby actuating the relay 94 and its associated circuitry.

When a very strong signal is applied to the receiver, a low noise voltage is applied to the amplifying device 66. The voltage at the anode 68 drops slightly and is still at a relatively high value. In this case, the initial step up voltage at the grid 88 is higher. Less time will therefore be required to charge the capacitor 80 to the point to cause conduction within the device 88. The level 108 is maintained at the same value for all input signal levels. In practical situations, the input signal to the system must be sufficiently high to drive a bistable circuit from level 106 to level 108.

It is thus seen that a time delay in the actuation of the relay 94 takes place. This time delay is inversely proportional to the strength of the received carrier signal. A strong signal, i.e., a low noise signal, will therefore actuate the carrier operated relay before a weak, or high noise, signal.

Referring particularly to Figure 4, there is shown another type of time delay circuit which may be employed with the present invention. A signal representative of the carrier signal strength which may be a noise voltage, an A.G.C. voltage or any other suitable source of voltage, is applied across a grid leak or load resistor 110 through a pair of input terminals 112 and 114. The applied signal is amplified by an electron discharge device 116 comprising an anode 118, a cathode 120 and a control grid 122. A grid bias resistor 124 is connected between the cathode 120 and ground. The anode 118 is connected to B+ through a load resistor 126.

The voltage output from the anode 118 is coupled to a relay 128 through a resistor 130 and a diode 132. The diode 132 is biased by a battery 134 so that it is normally non-conductive. A capacitor 136 and a second battery 138 is connected in parallel relationship to the circuit including the diode 132, the relay 128 and the battery 134. In the circuit shown, the relay 128 may represent a carrier operated relay the actuation of which will affect the operation of various circuits including multiplexing and tone generator circuits.

In considering the operation of this circuit, the voltage supplied by the battery 138 may be considered a reference voltage which charges the capacitor 136 to a fixed point. With no signal applied to the circuit, the voltage at the anode 118 is not sufficient to cause conduction in the diode 132. When diode 132 is non-conducting, the relay 128 is inoperative or not actuated.

When the input signal is at a level 140 represented by the waveform at the input terminals 112 and 114, the conduction within the device 116 will be relatively high causing the voltage at the anode 118, to be relatively low. When the input voltage drops to a level 142, the voltage at the anode 118 will rise. The rise in voltage at the anode is applied to the diode 132. However, since the capacitor 136 offers a low impedance path to the increased anode voltage the capacitor will begin to charge towards the anode voltage. Its rate or time of charge depends upon the value of anode voltage. The higher the anode voltage, the faster will be rate of charge of the capacitor and the shorter will be the time delay before the diode 132 will conduct.

During no signal reception the voltage at the anode 118 may be lower than the voltages provided by either of the batteries 134 or 138. The voltage of the battery 134 may be higher than the voltage of the battery 138 to provide the initial cutoff bias for the diode 132. When the voltage at the capacitor 136 has charged to the point where it exceeds the voltage of the battery 134, conduction occurs in the diode thereby operating the relay 128. It is seen that the stronger the input voltage to the terminals 112 and 114, the less the voltage of the anode 118 will be. The capacitor 136 then takes a longer time to charge and the conduction of the diode 132 is delayed. With a strong signal or a drop in the input voltage, the anode voltage will be relatively high. Less time will therefore be required in charging the capacitor 136 and a shorter time delay takes place before the diode 132 starts to conduct.

Referring particularly to Figure 5, there is shown still another time delay circuit which may be employed with the present invention. An input signal, which may be a noise voltage having levels 144 and 146, is applied to a pair of input terminals 148 and 150 across an input resistor 152. The input signal is amplified by an electron discharge device 154 comprising an anode 156, a cathode 158 and a control grid 160. The anode is connected to B+ through a resistor 162 and the cathode 158 is connected to ground through the biasing resistor 164.

The anode 156 is coupled to a second electron discharge device 166 through a resistor 168. The device 166 comprises an anode 170, a cathode 172 and a control grid 174. An input resistor 176 is connected between the control grid 174 and ground. The anode 170 is connected to B+ through a relay 178, which may be a carrier operated relay for the purpose previously described.

The anode 156 is also coupled to a time delay network through the resistor 168. This network includes a capacitor 180 serially connected to a battery 182.

The device 166 is normally biased so that little or no current flows through the relay 178 when the input signal is at the level 144. At this level, the voltage at the anode 156, and consequently at the grid 174, is relatively low. When the input signal is reduced to the level 146, the voltage at the anode 156 will rise and the voltage at the grid 174 will tend to rise. However, the shunt path offered by the capacitor 180 will prevent the voltage at the grid 174 from rising instantaneously. The capacitor 180 will start to charge to the level of the voltage at the anode 156. The rate of charge depends to a great extent upon the voltage of the anode 156 and to some extent upon the values of the capacitor 180 and its associated components including the resistor 168.

It is seen that the battery 182 provides a reference potential to which the grid 174 rises in a step when the voltage at anode 156 rises. The time delay elapsing before the relay 178 is actuated depends upon the strength of the incoming signal. The lower the level to which the input signal drops, the shorter will be the time delay. Likewise, the higher the input signal, the longer will be the time delay. If the strength of the input signal voltage is inverse to an intelligence signal received by an F.M. receiver, it is seen that the stronger intelligence signal will operate the relay 178 before a weaker intelligence signal.

If it is desired to have the intelligence signals actuate the relays shown, instead of the noise voltage, another amplifier or phase inversion device may be employed prior to the input terminals shown.

Numerous other types of time delay circuits may, of course, be employed in carrying out the present invention. Any type of voltage which is indicative of the signal strength may be employed to control a device which affects the transmission of a control signal from one of the fixed stations to other fixed stations within the system. The time delay means employed should introduce a delay in actuating the relay or other device which is inversely proportional to the strength of the received intelligence signals from a mobile station.

It is noted that the present invention has been described in terms of plurality of fixed or base stations and a mobile station. However, it is recognized that transmission of V.H.F. signals may also be used for communication from one fixed station to another. For example, one of the fixed stations along a turnpike may be used to communicate intelligence signals with one of the toll stations of the turnpike system or to local Police stations. Likewise, a fixed station, rather than a mobile station, may be used as the originating station. Numerous types of combinations and systems employing the present invention will be obvious and suggest themselves to those skilled in the art to which the invention pertains.

It is evident that the present invention may be employed in numerous types of communication systems other than those employed on turnpikes or highways. For example, communication systems associated with boats, trains and airplanes may utilize delay circuits which provide time delay inversely proportional to the strength of a received signal to control a device or operation of an electrical circuit. Also, different types of telephone circuits may embody the principles covered by the present invention.

What is claimed is:

A highway communication system comprising a plurality of fixed stations each having a first transmitter and a first receiver operative in the ultra high frequency range for providing two way communication between each of said fixed stations, a second transmitter and a second receiver for transmitting and receiving electrical signals in the very high frequency range at each of said fixed stations, a mobile station including means for transmitting and receiving electrical signals in the very high frequency range to provide communication between said mobile station and said fixed stations, means providing a control signal at each of said fixed stations, a carrier operated relay at each of said fixed stations adapted to be actuated by electrical signals from said mobile station, means for transmitting said control signal directly from one of said fixed stations to all of the other fixed stations within said system upon operation of said carrier operated relay, means responsive to said control signal to render inoperative said second receiver in all of said other fixed stations, and time delay means interposed between said second receiver and said carrier operated relay in each of said fixed stations to provide a delay in the actuation of said carrier operated relay, said delay being inversely proportional to the strength of said electrical signals received by said second receiver from said mobile station.

References Cited in the file of this patent

UNITED STATES PATENTS

| | | |
|---|---|---|
| 2,292,222 | Haigis | Aug. 4, 1942 |
| 2,734,131 | Magnuski | Feb. 7, 1956 |